(12) United States Patent
Chen et al.

(10) Patent No.: US 12,099,366 B2
(45) Date of Patent: *Sep. 24, 2024

(54) SYSTEM FOR OBSTACLE DETECTION

(71) Applicant: PIXART IMAGING INC., Hsin-Chu (TW)

(72) Inventors: Kai-Shun Chen, Hsin-Chu (TW); Wei-Chung Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,084

(22) Filed: Apr. 27, 2023

(65) Prior Publication Data

US 2024/0085921 A1 Mar. 14, 2024

Related U.S. Application Data

(63) Continuation of application No. 17/227,732, filed on Apr. 12, 2021, now Pat. No. 11,669,103, which is a continuation of application No. 15/869,291, filed on Jan. 12, 2018, now Pat. No. 11,009,882.

(51) Int. Cl.
G05D 1/00 (2024.01)
G06V 10/141 (2022.01)
G06V 20/58 (2022.01)

(52) U.S. Cl.
CPC ......... *G05D 1/0248* (2013.01); *G05D 1/0214* (2013.01); *G05D 1/0238* (2013.01); *G05D 1/0246* (2013.01); *G06V 10/141* (2022.01); *G06V 20/58* (2022.01)

(58) Field of Classification Search
CPC .................................................. G05D 1/0248
See application file for complete search history.

(56) References Cited

U.S. PATENT DOCUMENTS 9,002,511 B1 * 4/2015 Hickerson ............ G05D 1/0248
700/245
11,009,882 B2 * 5/2021 Chen .................... G05D 1/0238
(Continued)

FOREIGN PATENT DOCUMENTS

CN 1354073 A 6/2002
CN 101088720 A 12/2007
(Continued)

*Primary Examiner* — Michael A Berns
(74) *Attorney, Agent, or Firm* — Li & Cai Intellectual Property (USA) Office

(57) ABSTRACT

A system for obstacle detection adapted to a self-guiding machine is provided. The system includes a controller, a linear light source and a light sensor. The linear light source and the light sensor are set apart at a distance. When the linear light source emits an indicator light being a vertical linear light projected onto a path the self-guiding machine travels toward, the light sensor senses the indicator light. The vertical linear light is segmented into a first segment projected to a ground and a second segment projected to a floating obstacle when the self-guiding machine approaches the floating obstacle with a height from the ground and the indicator light is projected to the floating obstacle, in which the second segment of the light sensed by the light sensor is determined as the floating obstacle in front of the self-guiding machine.

11 Claims, 14 Drawing Sheets

(56) References Cited

U.S. PATENT DOCUMENTS

| | | | |
|---|---|---|---|
| 11,669,103 B2* | 6/2023 | Chen .................. | G01S 17/46 |
| | | | 701/301 |
| 2015/0120056 A1 | 4/2015 | Noh et al. | |
| 2015/0168954 A1 | 6/2015 | Hickerson et al. | |
| 2024/0042630 A1* | 2/2024 | Wang .................. | G01S 17/04 |
| 2024/0085921 A1* | 3/2024 | Chen .................. | G06V 20/58 |

FOREIGN PATENT DOCUMENTS

| | | |
|---|---|---|
| CN | 101430207 A | 5/2009 |
| CN | 201766649 U | 3/2011 |
| CN | 102866433 A | 1/2013 |
| CN | 103294057 A | 9/2013 |
| CN | 103424112 A | 12/2013 |
| CN | 104027041 A | 9/2014 |
| CN | 104055462 A | 9/2014 |
| CN | 104182062 A | 12/2014 |
| CN | 104487864 A | 4/2015 |
| CN | 104914447 A | 9/2015 |
| CN | 105286729 A | 2/2016 |
| CN | 205031182 U | 2/2016 |
| CN | 105974427 A | 9/2016 |
| CN | 205898143 U | 1/2017 |
| CN | 106855411 A | 6/2017 |
| CN | 206757399 U | 12/2017 |
| CN | 107544517 A | 1/2018 |
| KR | 1020130141979 A | 12/2013 |
| TW | 201741096 A | 12/2017 |

\* cited by examiner

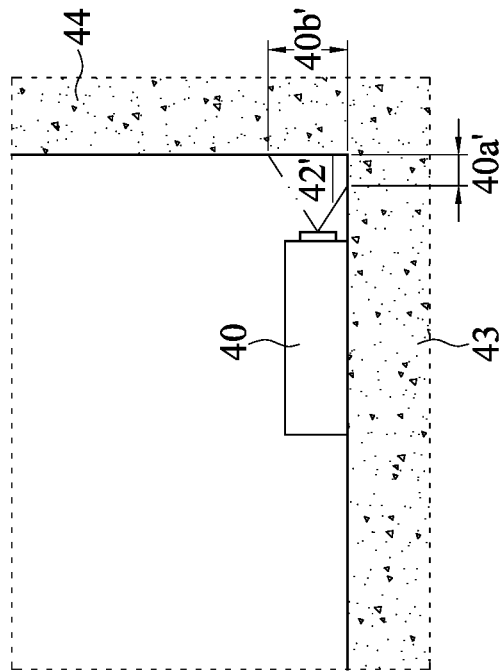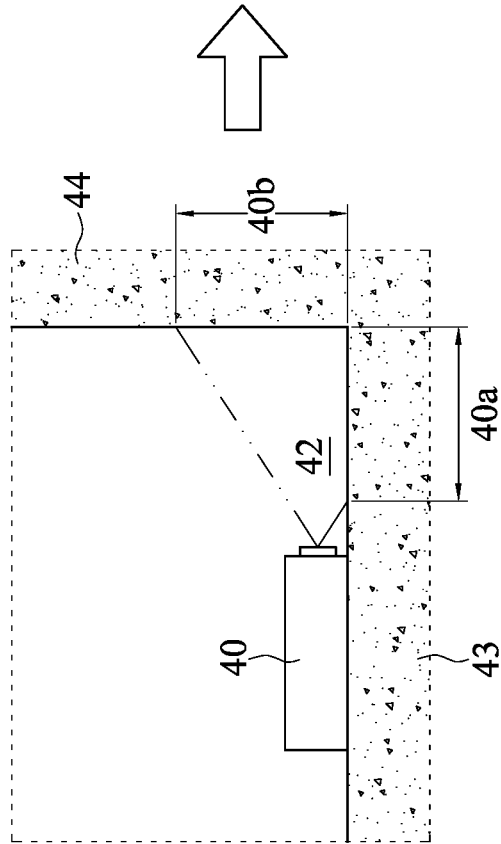

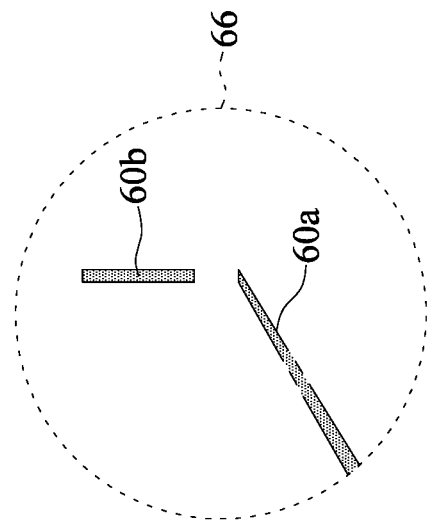
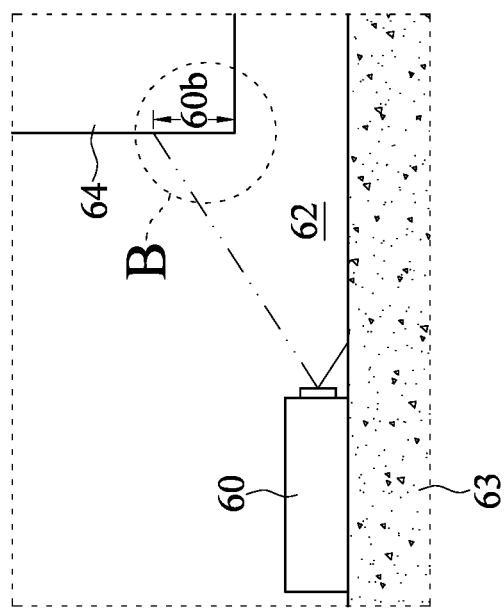
FIG. 6B
FIG. 6A

SYSTEM FOR OBSTACLE DETECTION

CROSS-REFERENCE TO RELATED PATENT APPLICATION

This application is a continuation application of U.S. application Ser. No. 17/227,732, filed on Apr. 12, 2021, and entitled "SYSTEM FOR OBSTACLE DETECTION", now pending, which is a continuation application of U.S. application Ser. No. 15/869,291, filed Jan. 12, 2018, and entitled "METHOD, SYSTEM FOR OBSTACLE DETECTION AND A SENSOR SUBSYSTEM", now issued as U.S. Pat. No. 11,009,882, the contents of which are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a technology for detecting obstacle, and in particular to a system for detecting an obstacle that is on the path of a moving machine thereof.

BACKGROUND OF THE DISCLOSURE

A self-guiding device, e.g. an automatic vehicle or an automatic robot cleaning machine, should avoid colliding with the other things or falling from a height. To avoid colliding with a wall, the self-guiding device requires a proximity sensor to determine a distance to the wall in order to avoid the collision. A conventional proximity sensor is such as radar, ultrasonic sensor, or a light (infrared ray) sensor that is a sensor able to find out the presence of any nearby object without a physical contact.

For example, the ultrasonic sensor is utilized to emit ultrasonic waves and receive the reflected waves for determining the front article that reflects the ultrasonic waves. The time difference between the times for emitting and receiving can be used to determine the distance. For cliff detection, a cliff sensor mounted at the bottom of the self-guiding device utilizes an infrared ray or ultrasonic waves to detect the presence of a floor under the device by measuring the reflected or scattered infrared ray or waves from the surface of the floor. Therefore, such the cliff sensor can prevent the device from traveling over the cliff when the cliff sensor detects itself moves over the cliff.

When the self-guiding device is able to detect the obstacle, e.g. the wall or the cliff, its controller can conclude the sensed data and instruct a driving system of the self-guiding device to stop the device or avoid the obstacle when it approaches or arrives the obstacle.

SUMMARY OF THE DISCLOSURE

For further understanding of the instant disclosure, reference is made to the following detailed description illustrating the embodiments of the instant disclosure. The description is only for illustrating the instant disclosure, and not for limiting the scope of the claim.

One of the objectives of a system for obstacle detection in one aspect of the disclosure is to detect an obstacle on the path a self-guiding machine travels. The process of obstacle detection is performed in the self-guiding machine when it travels around an area. An algorithm operated in the self-guiding machine is used to process the data that is generated by a sensor subsystem installed in the machine.

In an aspect of the present disclosure, the system includes a controller, a light emitter and a light sensor. The light emitter being coupled to the controller can be a Laser or an LED that acts as a linear light source. The light emitter emits a linear light as an indicator light that is a vertical linear light being projected onto a path the self-guiding machine travels toward. The light sensor being coupled to the controller is used to sense the indicator light projected onto the path. In particular, the light emitter and the light sensor are set apart at a distance. When the self-guiding machine approaches a floating obstacle with a height from a ground and the indicator light is projected to the floating obstacle, the vertical linear light is segmented into a first segment projected to the ground and a second segment projected to the floating obstacle. The second segment of the indicator light sensed by the light sensor is used to determine that there is the floating obstacle in front of the self-guiding machine.

Further, the system can obtain a spatial relationship that is used to compute the distance between the self-guiding machine and the floating obstacle, and determine if the self-guiding machine will collide with the floating obstacle when compared with a collision threshold stored in a memory of the system. In which, any change of a length, a slope, a position and/or an area of the indicator lights in both images of the first segment and the second segment within a time period can be used to determine a change of the spatial relationship between the self-guiding machine and the floating obstacle.

Still further, the linear light emitted by the light emitter is projected onto both the ground and the floating obstacle so as to form the first segment and the second segment of the indicator light being sensed when the self-guiding machine approaches the floating obstacle. At least one feature of the indicator light is sensed is a length of the first segment or the second segment, a position of the second segment and/or a slope of the first segment. A change of the length of the indicator light is used to obtain a moving trend of the self-guiding machine and to determine whether or not the self-guiding machine approaches the floating obstacle.

Further, the light sensor can capture a series of images containing the indicator light for a period of time, and a change occurring in the series of images can be used to determine whether or not the self-guiding machine approaches the floating obstacle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 4A and FIG. 4B are the schematic diagrams showing a self-guiding machine approaches a wall in one embodiment of the present disclosure;

FIG. 6A through FIG. 6D are the schematic diagrams showing a self-guiding machine approaches an obstacle with a height from a ground in one embodiment of the present disclosure;

DETAILED DESCRIPTION OF THE EXEMPLARY EMBODIMENTS

Figure 1:
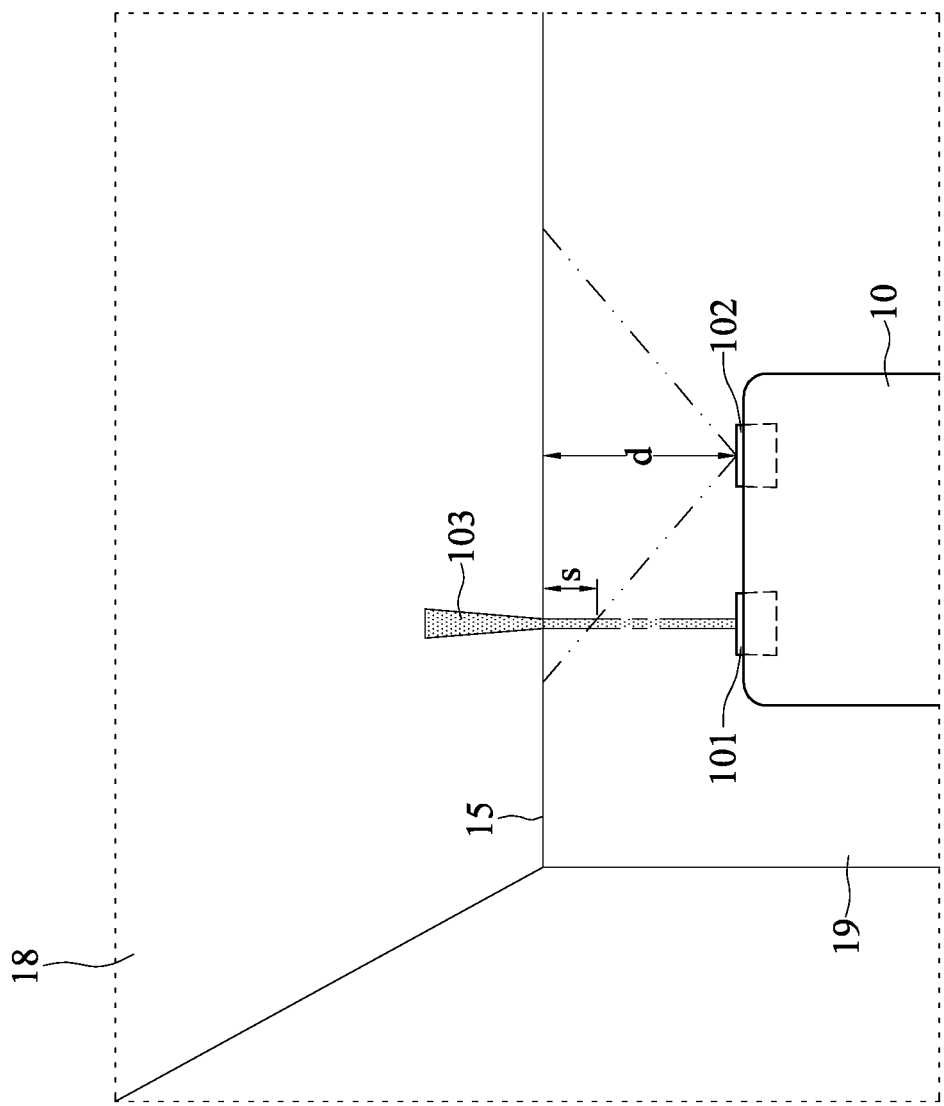
FIG. 1 shows a schematic diagram using a top view to depict a circumstance that a self-guiding machine approaches an obstacle in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a system for obstacle detection adapted to a self-guiding machine. The self-guiding machine is such as an autonomous vehicle or an autonomous cleaning robot that can navigates an area automatically. The method allows the self-guiding machine to sense and identify an obstacle in front of the machine, and then drives the self-guiding machine to avoid the obstacle automatically. The system for obstacle detection is exemplified as a sensor subsystem that essentially includes a light emitter and a light sensor that can be installed in the self-guiding machine.

It is featured that the light emitter and the light sensor are set apart at a distance in a horizontal direction, and the light emitter and the light sensor can be disposed at the same or different horizontal level of position. The light emitter may utilize a Laser or an LED to be a linear light source that emits a linear light as the indicator light, or alternatively emits a certain area of light as the indicator light. The light sensor is used to sense the linear light or the certain area of light that is projected onto a path the self-guiding machine travels toward.

Further, one of the objectives of the method and the system for obstacle device in one aspect of the disclosure is to detect the obstacle, e.g. a wall, a cliff, or a floating obstacle, on the path the self-guiding machine travels. The method can be implemented by an algorithm operated in the system for obstacle detection. The self-guiding machine can itself process the data that is generated by the sensor subsystem and perform an avoidance measure.

Reference is made to FIG. 1 showing a schematic diagram that uses a top view to depict a circumstance that a self-guiding machine approaches an obstacle in one embodiment of the present disclosure.

A self-guiding machine 10 shown in the diagram can be an autonomous robot, e.g. an autonomous cleaning device that navigates an area with various terrains. A system for obstacle detection is installed in the self-guiding machine 10 for sensing the obstacle on a path the self-guiding machine 10 travels toward. The system can exemplarily include a sensor subsystem that essentially includes a light emitter 101, a light sensor 102 and a processing circuitry. The diagram also shows the light emitter 101 and the light sensor 102 that are set apart at a distance from each other in a horizontal direction. It is noted that the light emitter 101 and the light sensor 102 are not necessary to be disposed at the same horizontal level of position.

The light emitter 101 exemplarily utilizes a Laser or an LED to be a light source to emit a linear light 103. The linear light 103 may be formed by the light source through a specific lens. When the self-guiding machine 10 travels, the linear light 103 is continuously projected onto a scene, e.g. a ground 19 or any surface of any terrain, in front of the self-guiding machine 10. For example, when the self-guiding machine 10 travels toward a wall 18 that forms the obstacle at a distance 'd' from the self-guiding machine 10, the linear light 103 acting as an indicator light is projected onto both the wall 18 and the ground 19. A border 15 between the ground 19 and the wall 18 divides the linear line 103 into a first segment, i.e. the lower segment, and a second segment, i.e. the upper segment, of the indicator light being sensed. The light sensor 102 is such as a camera that has a field of view which is indicated by two dotted lines drawn in the diagram for capturing an image. It is noted that the field of view of the light sensor 102 should cover the indicator light 13 for effectively detect a status of the self-guiding machine 10. The light sensor 102 is configured to sense the linear light 103 and capture an image containing this linear light 103. When the system for obstacle detection is operated in the self-guiding machine 10, a length 's' of the lower segment of the linear light 103 can be sensed by the light sensor 102. For example, a length 's' sensed by the light sensor 102 can be used to be an indicator used to determine the distance 'd.'

It should be noted that the distance 'd' between the self-guiding machine 10 and the wall 18 can be determined based on the length 's' that is sensed by the light sensor 102. Further, a horizontal position of the upper segment of the linear light 103 can also be the indicator used to determine the distance 'd.' Furthermore, in one embodiment, the light sensor 102 can continuously sense the indicator light, and the system can accordingly generate a series of images containing the indicator light. If any change of the length 's' appearing in the image of the lower segment of the linear light 103 or of the position/length of the upper segment of the linear light 103 has found in the series of images, the change allows the system to acknowledge that the self-guiding machine 10 is approaching or leaving the wall 18.

Therefore, in addition to the length or position of the indicator light captured by the light sensor 102, the any change of the aforementioned length or position of the indicator light obtained from the series of images can also be used to determine a status of the self-guiding machine 10, e.g. a moving trend of the self-guiding machine 10. The system for obstacle detection also establishes a warning mechanism for the self-guiding machine 10 according to a spatial relationship between the self-guiding machine 10 and the wall (18).

Figure 2:
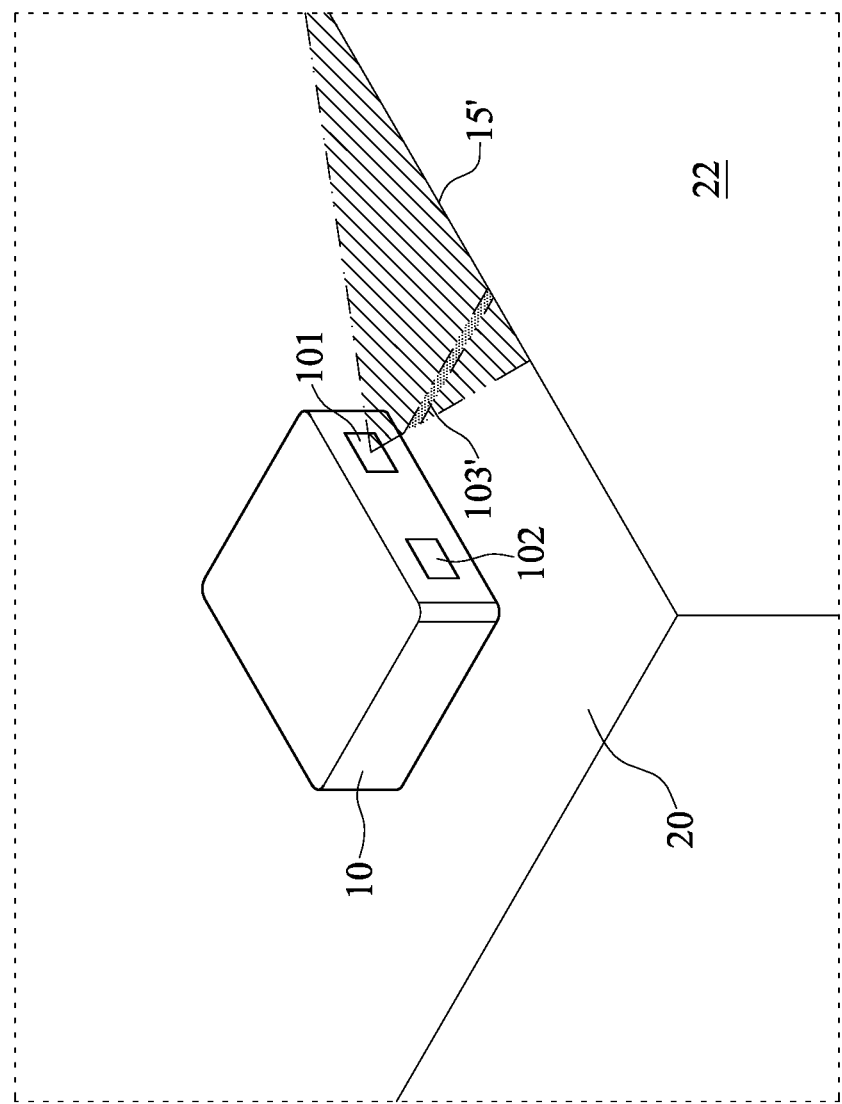
FIG. 2 shows a schematic diagram depicting a circumstance that a self-guiding machine is in front of a cliff in one embodiment of the present disclosure.

One further type of the obstacle is a cliff. Reference is made to FIG. 2 showing a schematic diagram depicting a circumstance that a self-guiding machine is in front of a cliff in one embodiment of the present disclosure.

The self-guiding machine 10 travels over a plane 20 of a terrain, e.g. a table or a ground and toward a cliff 22. The cliff 22 can be formed by a vertical section of the table or a downward stairway of the ground. The light emitter 101 of the self-guiding machine 10 continuously emits an indicator light 103' projected onto the way the machine 10 travels over. The indicator light 103' of the present example appears to be a linear light when the light emitter 101 emits the linear light in a vertical direction. The diagram utilizes section lines to present a range of the emitting light. The light sensor 102 senses the indicator light 103' within its field of view and the system generates an image containing the indicator light 103'.

According to the present embodiment, the indicator light 103' appears to be cut by an edge 15' between the plane 20 and the cliff 22. The cut indicator light 103' has been shown in the image captured by the light sensor 102. The indicator light 103' shows an obstacle, e.g. the cliff 22, will be met by the self-guiding machine 10 and its length or a slope/angle sensed by the light sensor 102 allows the system to determine a distance between the self-guiding machine 10 and the obstacle indicated by the edge 15'. Therefore, when the system for obstacle detection acknowledges the cliff 22 is on the way the self-guiding machine 10 travels over, the system will instruct the self-guiding machine 10 to avoid this obstacle.

Figure 3:
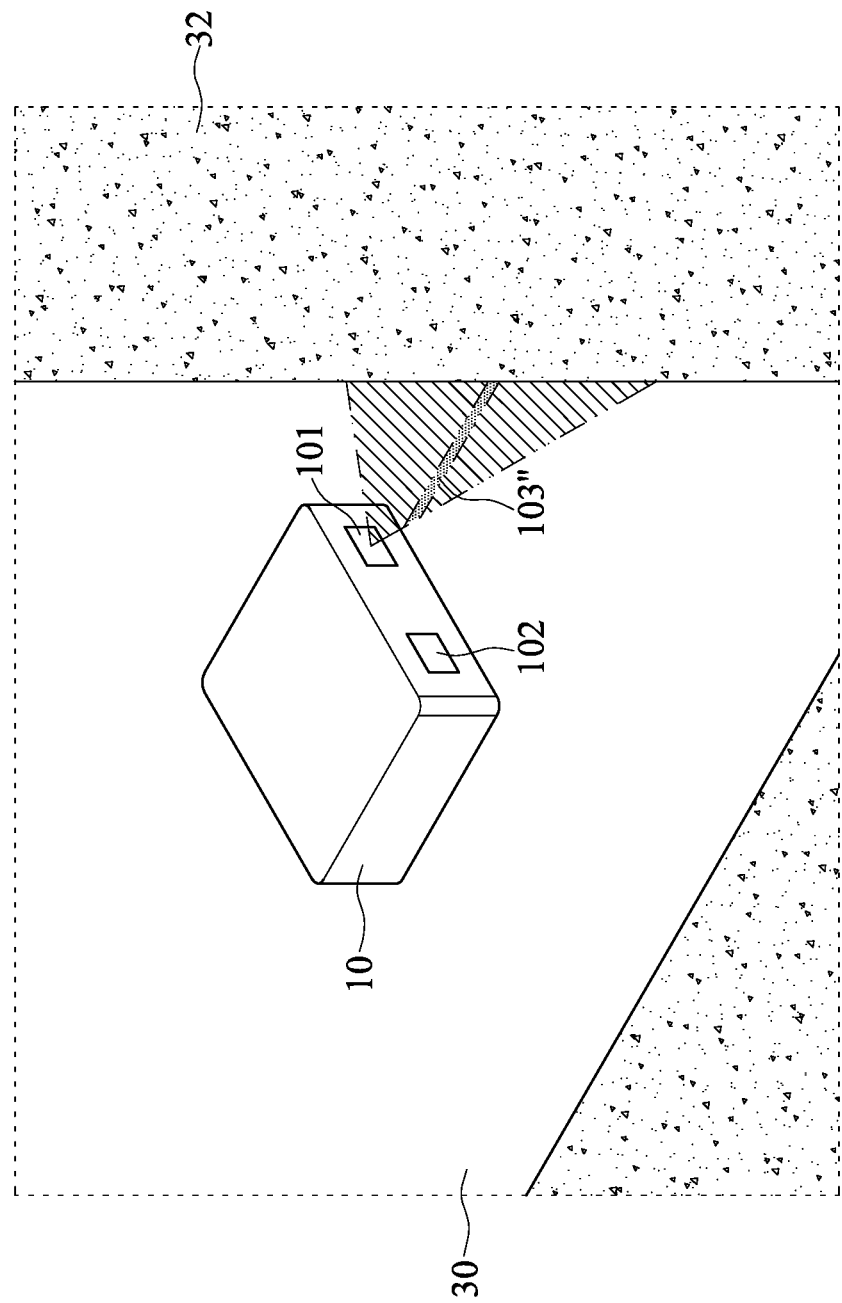
FIG. 3 shows another schematic diagram depicting a perspective view of a circumstance that the self-guiding machine is in front of a wall in one further embodiment of the present disclosure.

FIG. 3 shows another schematic diagram depicting a perspective view of a circumstance that the self-guiding machine is in front of a wall in one further embodiment of the present disclosure.

In the diagram, the self-guiding machine 10 travels over a ground 30 and toward a wall 32. The light emitter 101 of the self-guiding machine 10 emits a linear light as an indicator light in a vertical direction. The range of the emitting light covers both the ground 30 and the wall 32 in front of the self-guiding machine 10.

When the self-guiding machine 10 traveling over the ground 30 approaches the wall 32, the length of an indicator light 103" indicates how close the self-guiding machine 10 approaches the wall 32. In another aspect of the method for obstacle detection of the present disclosure, a slope or angle of the indicator light 103" can also show the spatial relationship between the self-guiding machine 10 and the wall 32; alternatively, a position of segment of the indicator light on the wall 32 can also be the indicator for depicting the spatial relationship.

According to the above embodiments of the method and the system for obstacle detection, a linear light emitted by the light emitter of the system installed in the self-guiding machine acts as an indicator light and the feature(s) of the indicator light can be used to determine a spatial relationship between the self-guiding machine and an obstacle, e.g. a wall or a cliff. Therefore, the system can effectively prevent the self-guiding machine from colliding with the wall or falling from the cliff. Since the light emitter and the light sensor of the system are set apart at a distance, i.e. preferably a horizontal distance, the features of the indicator light sensed by the light sensor can be analyzed for rendering the information such as a length, a position, a slope/angle and/or an area. At least one of the features is sufficient to be used to determine the spatial relationship between the self-guiding machine and the obstacle. Further, a change of one of the features between at least two images having the indicator light can be used to render a moving trend of the self-guiding machine. This moving trend allows the system to timely issue an alarm of collision or falling to the self-guiding machine.

FIG. 4A and FIG. 4B are the schematic diagrams showing a change of one of the features that allow the system to issue the alarm of collision to a self-guiding machine when it approaches a wall.

In FIG. 4A, this lateral view diagram shows a self-guiding machine 40 such as an autonomous vehicle travels over a ground 43. A light emitter of the system for obstacle detection installed in the self-guiding machine 40 emits an indicator light to the front of the machine 40. The light emitter has a range of emission 42 and its emitted light is confined to this range. The indicator light can be sensed by a light sensor of the system. When the self-guiding machine 40 is in front of a wall 44 within a specific distance that is available for the system to determine a spatial relationship between the self-guiding machine 40 and the obstacle, the indicator light is projected onto both the ground 43 and the wall 44. While the indicator light is sensed by the light sensor within its field of view, a first segment having a length '40a' and a second segment having a length '40b' are respectively computed by analyzing the image containing all or part of the indicator light.

While the self-guiding machine 40 approaches the wall 44, reference is made to FIG. 4B, it shows the range of emission 42' becomes smaller than the previous status. Simultaneously, the indicator light sensed by the light sensor has been changed. For example, the length of the first segment of the indicator light projected onto the ground 43 has been changed to "40*a*'" and the length of the second segment of the indicator light projected onto the wall 44 has been changed to "40*b*'." Therefore, the system for obstacle detection utilizes the feature of the length of the first segment or the second segment of the indicator light being sensed to determine the distance between the self-guiding machine 40 and the obstacle, e.g. the wall 44.

Furthermore, when the system captures two or more images containing the indicator light, a change of at least one feature of the indicator light can be used to obtain a moving trend of the machine and to determine if the self-guiding machine approaches the obstacle.

Figure 5B:
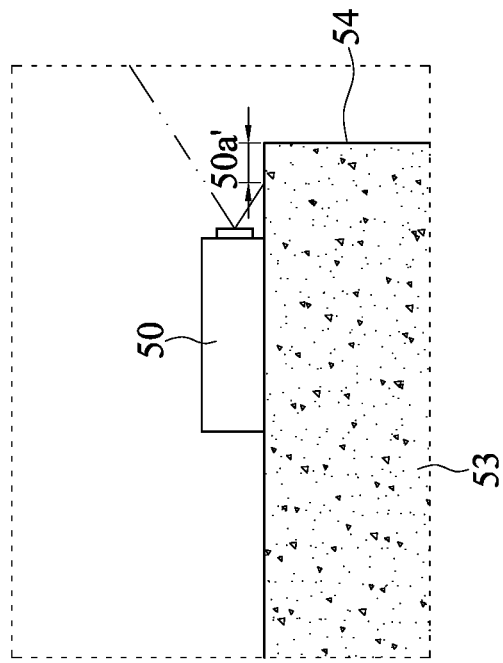
FIG. 5A and FIG. 5B are the schematic diagrams showing a self-guiding machine approaches a cliff in one further embodiment of the present disclosure.
Figure 5A:
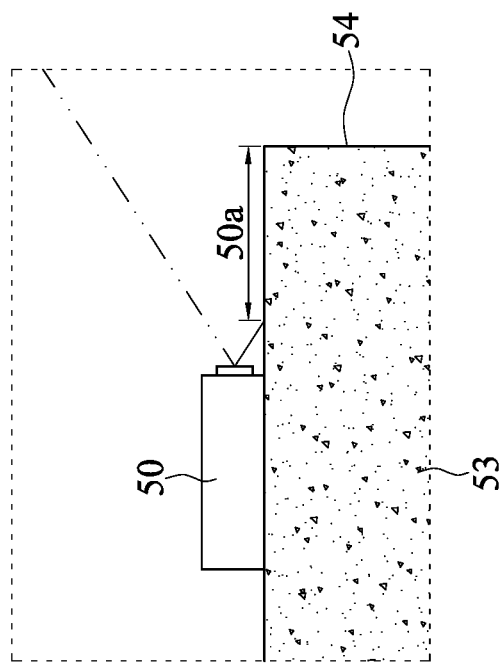

FIG. 5A and FIG. 5B are the schematic diagrams showing a change of one of the features that allow the system to issue a falling alarm to a self-guiding machine when it approaches a cliff.

In FIG. 5A, the lateral view diagram shows a self-guiding machine 50 travels over a ground 53 including a cliff 54 at a distance away. A light emitter of the system for obstacle detection in the self-guiding machine 50 emits an indicator light to the front of the machine 50. The indicator light can be sensed by a light sensor of the system. When the self-guiding machine 50 is at a distance in front of the cliff 54, a segment of the indicator light is projected onto the ground 53 and the rest of the indicator light is cut by an edge of the ground 53 due to the cliff 54. The indicator light projected onto the ground 53 leaves a distance '50*a*' to be sensed by the light sensor. While the indicator light is sensed by the light sensor within its field of view, the distance '50*a*' is computed by analyzing the image containing all or part of the indicator light.

While the self-guiding machine 50 approaches the cliff 54, reference is made to FIG. 5B, the distance of the indicator light projected onto the ground 53 becomes shorter. For example, the length of the indicator light sensed by the light sensor projected onto the ground 53 is '50*a*' in FIG. 5A, and then the indicator light projected onto the ground 53 has been changed to "50*a*'." Therefore, the system for obstacle detection also utilizes the feature of the length of the indicator light being sensed to determine the distance between the self-guiding machine 50 and the obstacle, e.g. the cliff 54.

Similarly, when the system captures two or more images containing the indicator light, a change of length of the indicator light can be used to obtain a moving trend of the machine and to determine if the self-guiding machine approaches the obstacle.

FIG. 6A through FIG. 6D are the schematic diagrams showing a self-guiding machine approaches a floating obstacle with a height from a ground in one further embodiment of the present disclosure.

In FIG. 6A, a self-guiding machine 60 travels over a ground 63 and approaches a floating obstacle 64. A light sensor of the self-guiding machine 60 senses an indicator light, for example a linear light, emitted by a light emitter of the system installed in the self-guiding machine 60. When the self-guiding machine 60 is in front of the floating obstacle 64 that is with a height from the ground 63, the indicator light within a range of emission 62 of the light emitter of the system forms two segments, i.e. a segment of the indicator light is projected to the ground 63 and the other segment of the indicator light is projected to the floating obstacle 64. The segment of the indicator light projected to the floating obstacle 64 forms a light with a length '60*b*' sensed by the light sensor.

As the system for obstacle detection is in operation, the light sensor of the system is driven to capture an image with the segment of indicator light projected onto the ground 63 and the other segment of the indicator light having a length '60*b*' projected onto the floating obstacle 64. The image can be referred to a frame 66 shown in FIG. 6B. The frame 66 shows at least two features extracted from the image captured by the light sensor. A first segment 60*a* shown in the frame 66 indicates the segment of indicator light projected onto the ground 63. A second segment 60*b* shown in the frame 66 indicates the segment of indicator light projected onto the floating obstacle 64.

Figure 6C:
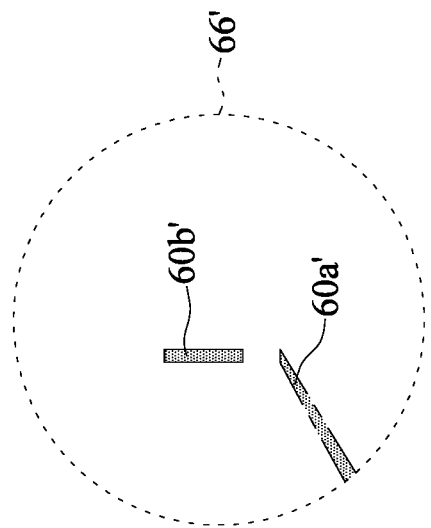

Next, in FIG. 6C, the self-guiding machine 60 is getting close to the floating obstacle 64 over the ground 63. The floating obstacle 64 causes changing the range of emission 62' of the light emitter of the system. Both the segments of indicator light respectively projected onto the ground 63 and the floating obstacle 64 have been changed. For example, the length of the segment of the indicator light projected onto the float obstacle 64 has been changed to length "60*b*" due to the spatial relationship between the self-guiding machine 60 and the floating obstacle 64 has been changed.

Figure 6D:
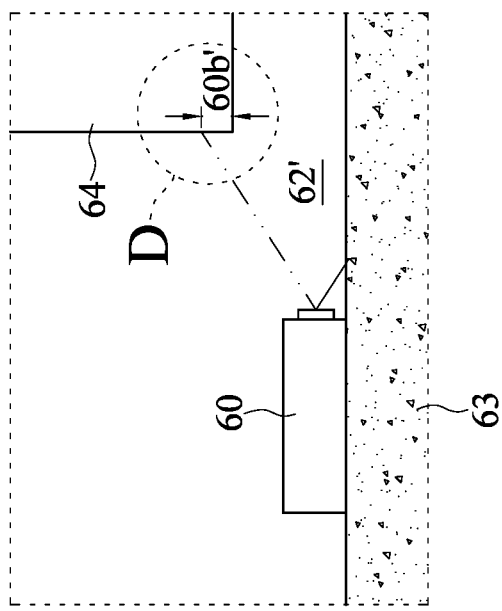

The image captured by the light sensor can be referred to the frame 66' shown in FIG. 6D. When the self-guiding machine 60 approaches the floating obstacle 64, both features of the first segment 60*a*' and the second segment 60*b*' have been changed. It shows both the length and the slope of the first segment 60*a*' have been changed. For example, the length of the first segment 60*a*' is shorter than the length of the first segment 60*a*, and the slope thereof also changes when the self-guiding machine 60 approaches the floating obstacle 64. Further, both the length and the position of the second segment 60*b*' have been changed. For example, the length of the second segment 60*b*' is shorter than the length of the second segment 60*b*, and the position of thereof shifts to the left in the same instance.

According to one of the embodiments, a sensor module essentially includes a light emitter and a light sensor that are set apart at a distance. The light emitter emits a type of an indicator light, and the light sensor captures one image at one time or a series of images containing the indicator light for a period of time. The indicator light emitted by the light emitter is such as a linear light, a circular light or any shape of light projected onto the way the self-guiding machine travels toward. The light sensor can capture an image containing the indicator light. Through an image analysis process, the information extracted from the indicator light being captured is used to determine a spatial relationship between the self-guiding machine and an obstacle. The spatial relationship allows the system to instruct the driving system of the self-guiding machine to avoid risk of collision or falling.

Figure 7:
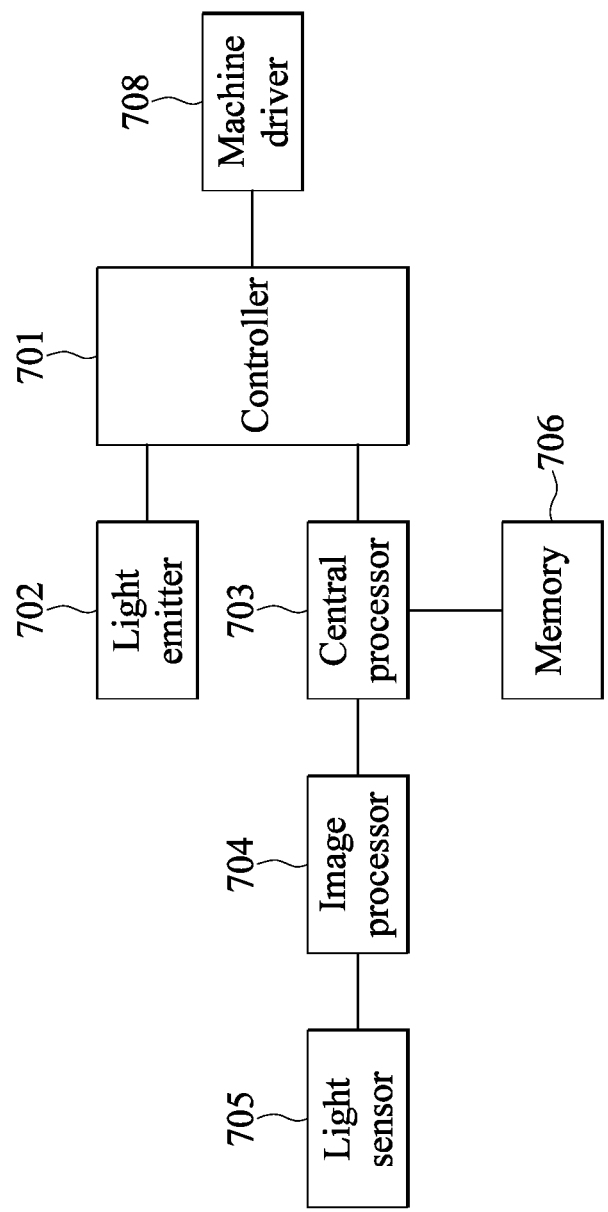
FIG. 7 shows circuit blocks of a system for obstacle detection according to one embodiment of the present disclosure.

FIG. 7 shows circuit blocks of a system for obstacle detection according to one embodiment of the present disclosure.

The system for obstacle detection with a sensor subsystem that has capability of data processing since it has its own processor and memory. The sensor subsystem is used to collect the environmental information around it and to process the environment information for rendering a protection mechanism. The environment information is such as images of environment around the self-guiding machine adopting this system. The environmental information allows the system to determine if the self-guiding machine will meet any risk of damage.

The functions provided by the system are implemented by the circuit components shown in the diagram. The system includes a controller 701 that is in charge of controlling operations of the other circuit components for operating the system. The controller 701 is used to drive a light emitter 702 to emit the indicator light, and also control a light sensor 705 to sense the light signals within its field of view. In an exemplary example, the indicator light such as a linear light, a circular light or any type of the indicator light can be controlled to function in a full-time manner or periodically. The system includes the light emitter 702 coupled to the controller 701. The light emitter 702 has a light source and its driving circuit and is used to emit an indicator light through a requisite optical component and/or a window that is mounted on a surface of the self-guiding machine. The optical component is such as a lens that can be used to guide the indicator light to be a linear light, a circular light or any shape of the light. The system includes the light sensor 705 coupled to the controller 701. The light sensor 705 set apart at a distance from the light emitter 702 is used to sense the indicator light emitted by the light emitter 702. Then the scene in front of the self-guiding machine is captured by the light sensor 705 and then transmitted to an image processor 704 of the system for generating an image containing the indicator light. The image processor 704 is coupled to the light sensor 705 and is used to generate the image. The image is temporarily buffered, for example, in a memory 706.

According to a circuitry planning in one embodiment of the disclosure, the light emitter 702, the light sensor 705 and the image process 704 form a sensor subsystem installed in the self-guiding machine. The sensor subsystem is in charge of generating the indicator light and rendering the image of the indicator light. Therefore, the self-guiding machine can use at least one feature of the indicator light being sensed to obtain a spatial relationship between itself and an obstacle when the self-guiding machine approaches the obstacle on its path.

After that, at least one feature of the indicator light involved in the image is processed by a central processor 703 that is coupled to the image processor 704 and the controller 701. The central processor 703 is used to perform the method for obstacle detection. In one embodiment of the present disclosure, the memory 706 coupled to the central processor 703 acts as a system memory or storage that can be used to store the instructions for performing the functions provided by the system, for example the method for obstacle detection. The method performed by the central processor 703 primarily includes analyzing the image containing the indicator light sensed by the light sensor 705, obtaining at least one feature of the indicator light being sensed, and obtaining a spatial relationship between the self-guiding machine and an obstacle in response to the at least one feature of the indicator light being sensed when the self-guiding machine approaches the obstacle on its path.

According to one embodiment of the present disclosure, the information extracted by the sensor subsystem from the image having the indicator light can be used to estimate a distance to an obstacle. Further, the spatial relationship, e.g. the distance between the self-guiding machine and the obstacle, allows the system to determine if the self-guiding machine will be in any dangerous situation, for example colliding with a wall or falling from a cliff. In an exemplary example, the controller 701 of the system is coupled to a machine driver 708 that links to a driving system of the self-guiding machine adopting this system. When the system determines that an obstacle exists at a distance from the self-guiding machine, the controller 701 generates a signal for instructing a machine driver 708 for responding to the obstacle.

In one further embodiment, the light sensor 705 can also continuously captures a series of images covering the indicator light, and a change occurring in the series of images can be found and used to determine if the self-guiding machine approaches the obstacle. The self-guiding machine can process an avoidance measure in order to avoid the risk.

As a matter of illustration, the following figures are given as a guide to describe the method for obstacle detection in accordance with the embodiments described above.

Figure 8:
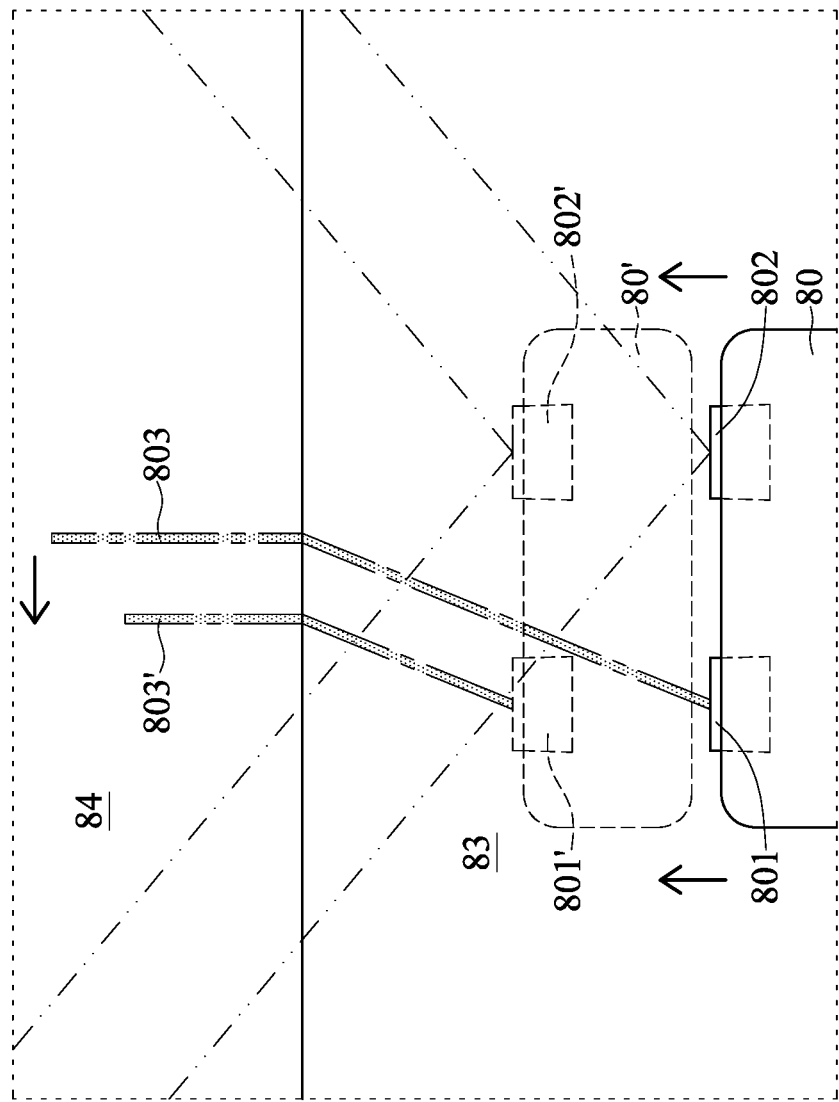
FIG. 8 shows a schematic diagram depicting a change of the indicator light captured by a light sensor of a self-guiding machine approaching a wall according to one embodiment of the present disclosure.

FIG. 8 shows a schematic diagram depicting a change of the indicator light captured by a light sensor of a self-guiding machine approaching a wall according to one embodiment of the present disclosure.

The system installed in a self-guiding machine 80, 80' is exemplified as the sensor subsystem essentially including a light emitter 801, 801' and a light sensor 802, 802'. The self-guiding machine 80, 80' acts as autonomous vehicle including a computer that drives the light emitter 801, 801' to emit indicator light, integrates data received by the light sensor 802, 802' and then processes the data for acquiring the terrain information regarding the path in front of the self-guiding machine 80.

As the diagram shows, the self-guiding machine 80 depicted by a solid line is at a first position when it travels over a ground 80. The self-guiding machine 80 includes the light emitter 801 and the light sensor 802. The light emitter 801 emits an indicator light 803. The indicator light 803 depicted in the diagram is based on the image sensed by the light sensor 802 in its viewing angle. The diagram shows the indicator light 803 has a turning point that divides the indicator light 803 into two segments due to a border between the ground 83 and the wall 84.

The self-guiding machine 80 then moves to a second position closer to the wall 84 and is marked as the self-guiding machine 80' that is depicted by a dotted line. At the second position, the light emitter 801' still emits an indicator light 803' and the light sensor 802' receives the indicator light 803' and generates another image. Similarly, the indicator light 803' depicted in the diagram is based on the image sensed by the light sensor 802' in its viewing angle. The border of between the ground 83 and the wall 84 causes the indicator light 803' to have another turning point that divides the indicator light 803' into two segments.

This exemplary example shows several changes of the indicator light 803, 803' projected onto both the ground 83 and the wall 84 when the self-guiding machine 80, 80' travels toward the obstacle, i.e. the wall 84. It should be noted that the light emitter 801, 801' emits a linear light and the light sensor 802, 802' senses the light within its sensing range confined by its viewing angle. The diagram shows when the linear light is projected onto both the ground 83 and the obstacle, i.e. the wall 84, at least one feature of the indicator light 803, 803' can be found by analyzing the image containing the indicator light 803, 803'. For example, a length, as one of the features, of a first segment of the indicator light 803, 803' projected onto the ground 83 becomes shorter when the self-guiding machine 80, 80' is closer to the wall 84. Further, a slope can act as another feature for detecting the obstacle since the image being sensed shows a slope of the first segment of the indicator light 803, 803' becomes larger when the self-guiding machine 80, 80' is closer to the wall 84. Furthermore, the shorter length or the left-shift position of a second segment of the indicator light 803, 803' projected onto the wall 84 can also act as one of the features to detect the obstacle when the self-guiding machine 80, 80' is closer to the wall 84. Therefore, in this exemplary example, a length of the first segment or the second segment, a position of the second segment and/or a slope/angle of the first segment can be regarded as the feature(s) allowing the system to detect the obstacle.

Figure 9:
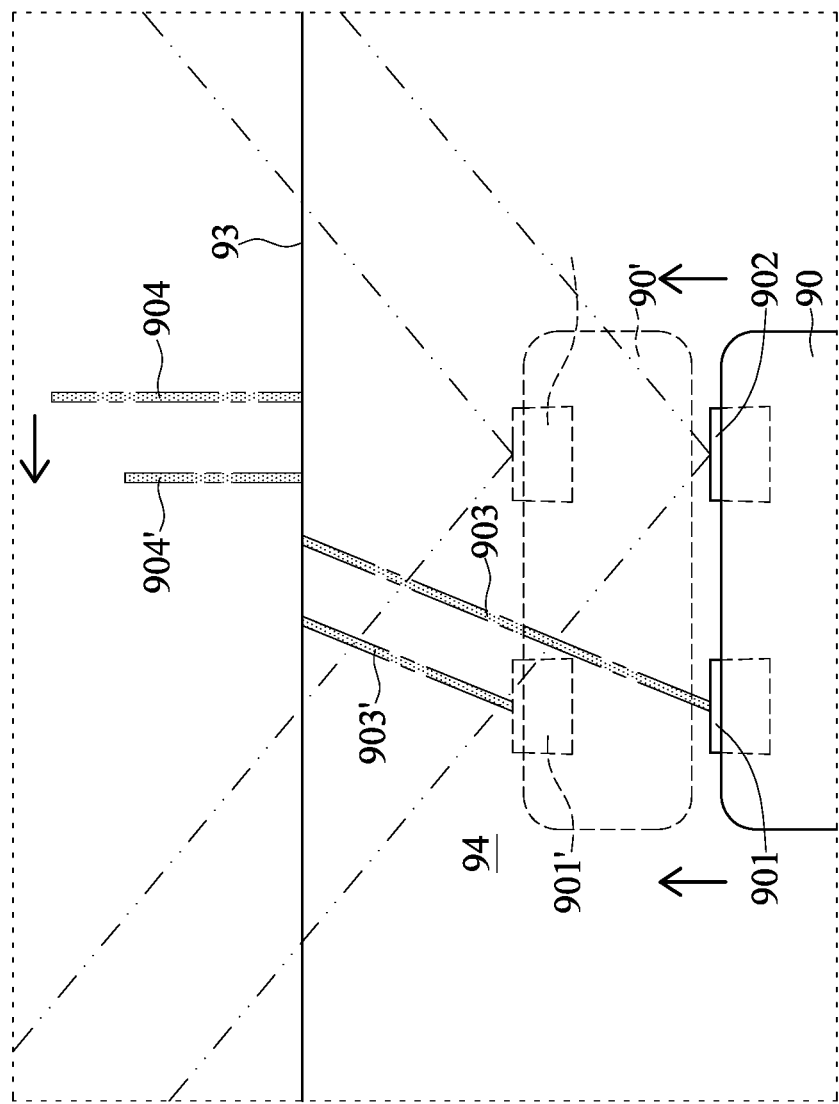
FIG. 9 shows a schematic diagram depicting a change of the indicator light captured by a light sensor of a self-guiding machine approaching a cliff according to one embodiment of the present disclosure.

FIG. 9 shows another schematic diagram depicting a change of the indicator light captured by a light sensor of a self-guiding machine approaching a cliff according to one embodiment of the present disclosure. The present example shows the self-guiding machine 90, 90' travels over a ground 94 and will meet an obstacle, i.e. a cliff, and the system in the self-guiding machine 90, 90' is required to detect the obstacle and avoid falling.

The diagram shows a self-guiding machine 90 depicted by a solid line is originally at a first position. A light emitter 901 of the self-guiding machine 90 at the first position emits an indicator light (903, 904), and a light sensor 902 captures an image containing the indicator light (903, 904) in its viewing angle. The self-guiding machine 90 then moves to a second position closer to an edge 93 and is marked as the self-guiding machine 90' depicted by a dotted line. At the second position, the light sensor 902' senses the indicator light (903', 904') emitted by the light emitter 901' of the self-guiding machine 90' in a viewing angle. The edge 93 formed by the cliff cuts the indicator light and the segment projected onto the ground 94 is marked as a first segment 903, 903'. It should be noted that the segment 904, 904' of the indicator light being sensed not well connected to the first segment (903, 903') is projected onto a distant wall with a distance from the cliff and is still sensed by the light sensor 902, 902'.

This exemplary example shows the length of the first segment 903, 903' of the indicator light being sensed by the light sensor 902, 902' becomes shorter and with larger slope when the self-guiding machine 90, 90' moves from the first position to the second position that is closer to the edge 93 of the cliff. Therefore, the feature(s) of the first segment 903, 903' of the indicator light being sensed by the light sensor 902, 902' can be the information for the system to detect the obstacle, i.e. the cliff. The system accordingly determines if the self-guiding machine 90, 90' approaches the edge 93 of the cliff.

Figure 10:
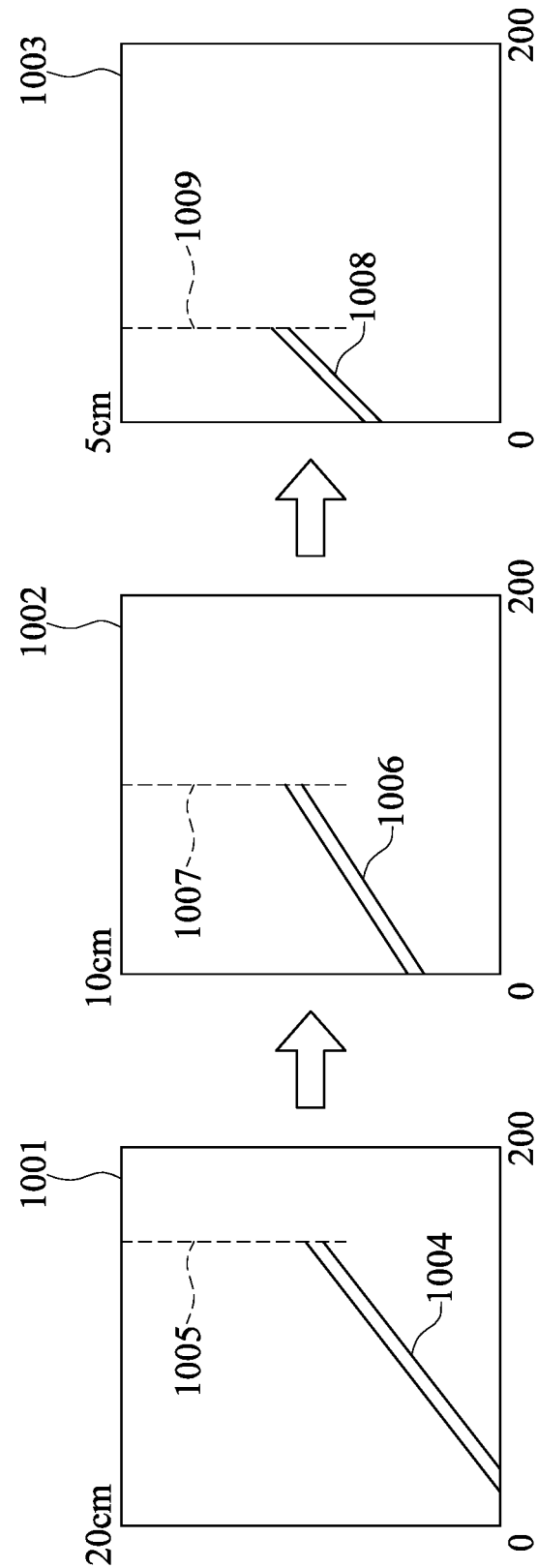
FIGS. 10A, 10B and 10C show examples of the received lights by a self-guiding machine that approaches an obstacle according to one embodiment of the present disclosure.

FIGS. 10A, 10B and 10C show three frames of images depicting an example of the received lights by a self-guiding machine that approaches an obstacle at a distance of 20 cm, 10 cm and 5 cm.

FIG. 10A shows a frame 1001 with a width from pixel 0 to pixel 200. The frame 1001 appears a light segment 1004 of indicator light projected onto a path the self-guiding machine travels toward when the self-guiding machine is at 20 cm distance from an obstacle, e.g. a wall or a cliff. The frame 1001 further uses a dotted line 1005 to indicate the position of the light segment projected onto the wall.

FIG. 10B shows another frame 1002 with the same width. The frame 1002 appears a light segment 1006 of the indicator light projected onto the path when the self-guiding machine is at 10 cm distance from the obstacle. The dotted line 1007 indicates the position of the light segment projected onto the wall. It is noted that the slope of the light segment 1006 is larger than the slope of the light segment 1004 shown in FIG. 10A; and as well the length of the light segment 1006 is shorter than the length of the light segment 1004 shown in FIG. 10A since the self-guiding machine is getting close to the obstacle.

FIG. 10C shows one more frame 1003 with the same width. The frame 1003 appears a light segment 1008 of the indicator light projected onto the path when the self-guiding machine is at 5 cm distance from the obstacle. The dotted line 1009 indicates the position of the light segment projected onto the wall. Similarly, the slope of the light segment 1008 is larger than the slope of the light segment 1006 shown in FIG. 10B; and as well the length of the light segment 1008 is shorter than the length of the light segment 1006 shown in FIG. 10B since the self-guiding machine is getting close to the obstacle.

On the other hand, according to the positions indicated by the dotted line 1005 of FIG. 10A, 1007 of FIG. 10B and 1009 of FIG. 10C, it is found that the segment of indicator light projected onto the obstacle, i.e. the wall, gradually moves to the left as the self-guiding machine approaches the obstacle. Therefore, the position of the light segment also acts as an indicator for indicating the spatial relationship between the self-guiding machine and the obstacle.

Figure 11:
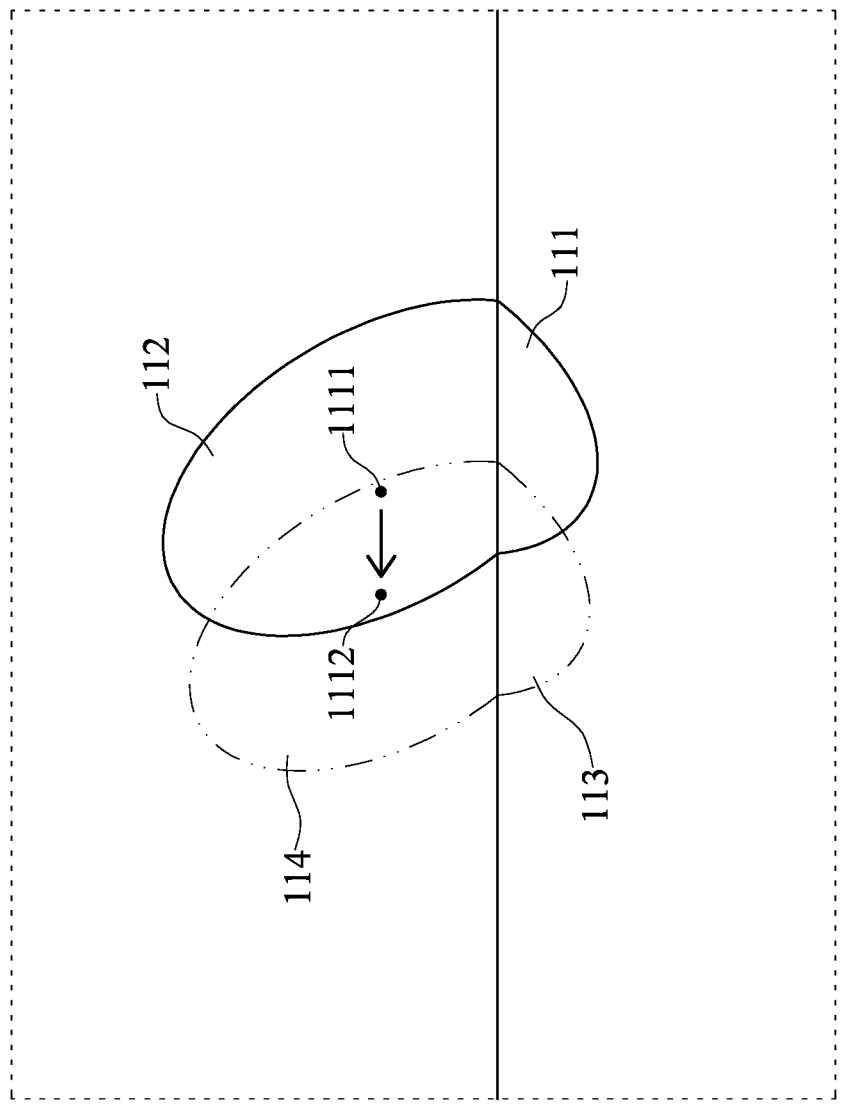
FIG. 11 shows a schematic diagram depicting a circular indicator light projected on a wall where a self-guiding machine approaches in one embodiment of the present disclosure.

The indicator light emitted by the light emitter of the system can also be a circular light. FIG. 11 shows a schematic diagram depicting a circular indicator light projected on a wall where a self-guiding machine approaches in one embodiment of the present disclosure.

The circular indicator light projected on the wall is sensed by the light sensor at a distance apart from the light emitter, and therefore the circular indicator light being sensed and shown in the diagram gets a little distorted. The circular indicator light being sensed specifies a reference point (1111, 1112) and is divided into a first segment (111, 113), e.g. the lower area, and a second segment (112, 114), e.g. the upper area by a dividing line. The dividing line can be a border between a ground and a wall or an edge of a cliff.

As the diagram shows, the solid circle indicates the self-guiding machine is at a first position, and the dotted circle indicates the self-guiding machine is at a second position that is closer to the obstacle, e.g. the wall. It appears that both the areas of the first segment and the second segment of the dotted circle are smaller than the solid circle when the self-guiding machine approaches the obstacle. Further, referring to the reference points 1111 and 1112 respective to the solid circle and the dotted circle, it appears that the dotted circle moves to the left relative to the solid circle as the self-guiding machine approaches the obstacle.

Therefore, the area and the position of the circular indicator light can act as the indicator for indicating the spatial relationship between the self-guiding machine and the obstacle.

When the system obtains the spatial relationship, the central processor of the system accordingly computes a distance between the self-guiding machine and the obstacle, and determines if the self-guiding machine will collide with the obstacle when compared with a collision threshold stored in a memory of the system. Similarly, the spatial relationship also allows the system to determine if the self-guiding machine will fall due to the obstacle when compared with a falling threshold stored in the memory.

Figure 12:
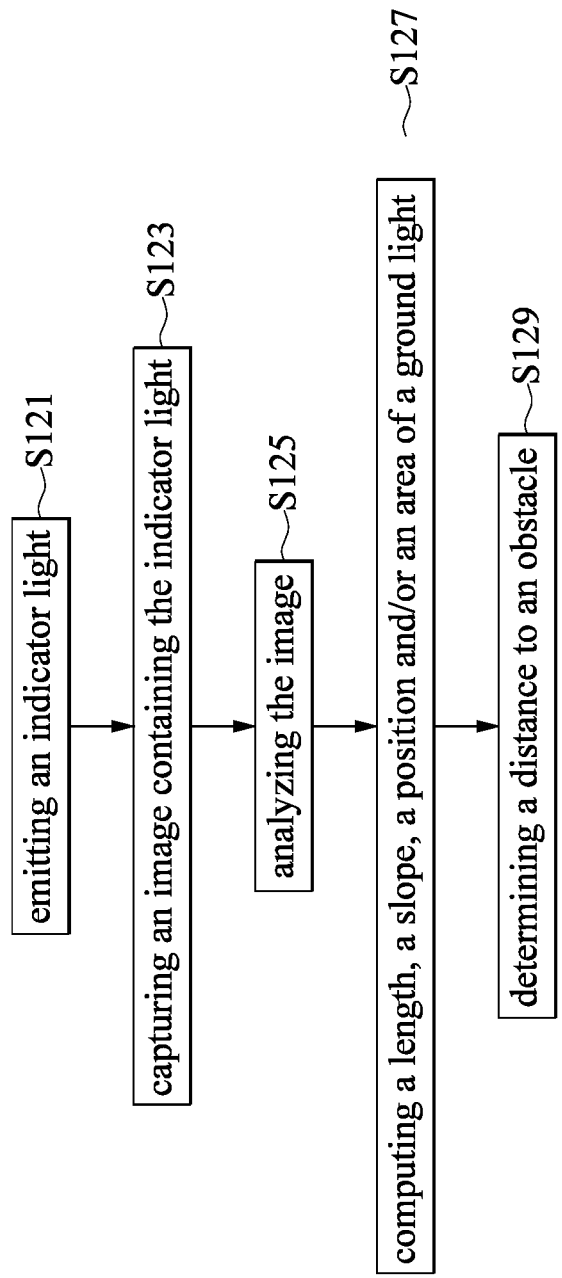
FIG. 12 shows a flow chart describing a process for obstacle detection adapted to a self-guiding machine in a one embodiment of the present disclosure.

The system exemplarily described in FIG. 7 performs the method for obstacle detection adapted to a self-guiding machine. Reference is made to FIG. 12 that shows a flow chart describing the method for obstacle detection in one embodiment.

In step S121, the light emitter of the system emits an indicator light, and in step S123 the light sensor of the system is used to senses the indicator light and generate an image. The light sensor is such as a camera that captures the image containing the indicator light within a viewing angle. The indicator light can reflect a spatial relationship between the self-guiding machine and the obstacle when the indicator light can be projected onto the path including the ground and/or the obstacle the self-guiding machine travels over. The image processor of the system then analyzes the image for acquiring at least one feature of the indicator light being sensed, such as step S125.

According to the above embodiments, the feature can be a length, a position, a slope and/or an area of the indicator light being sensed. Any of the features is provided for the central processor of the system to compute the length, the position, and/or the slope regarding the linear indicator light or the area regarding the circular indicator light. In step S129, the at least one feature allows the system to determines a distance between the self-guiding machine installing the system and an obstacle.

Figure 13:
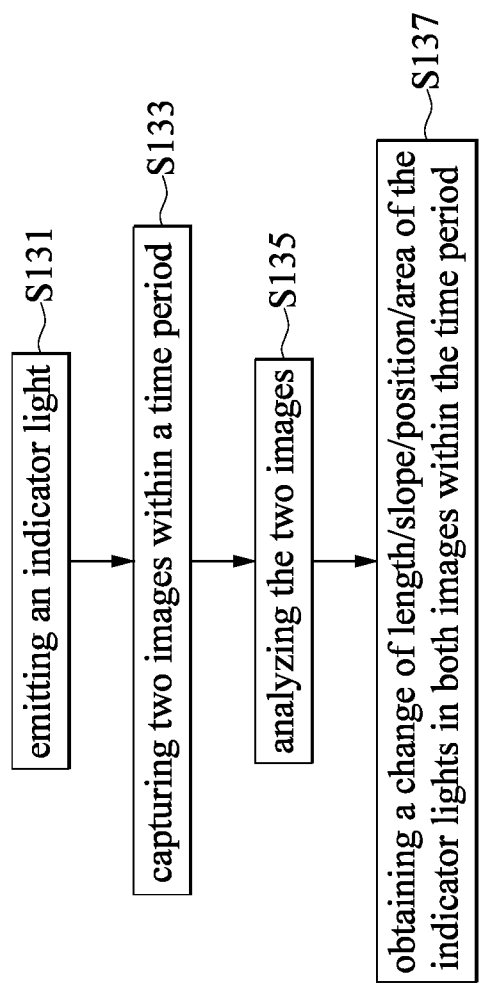
FIG. 13 shows a flow chart describing a process for obstacle detection adapted to a self-guiding machine in a one further embodiment of the present disclosure.

The system can also find a moving trend of the self-guiding machine according to the change of the feature extracted from the indicator light being sensed for a period of time by the light sensor of the system. Reference is made to FIG. 13.

In step S151, the light emitter continuously emits an indicator light projected onto the ground and/or the obstacle in front of the self-guiding machine. In step S153, the light sensor is driven to capture at least two different images containing the indicator light within a time period. By analyzing the at least two images, in step S155, the system can obtain at least one feature from individual image. The feature can also be the length, the position and/or the slope obtained from the linear indicator light being sensed by the light sensor, or the area obtained from the circular indicator light. In step S157, any change of length, slope, position and/or area of the indicator lights in both images within the time period can be obtained for determining the change of the spatial relationship between the self-guiding machine and the obstacle.

The change of the indicator light projected onto the ground and/or the obstacle can be used to determine the moving trend of the self-guiding machine. The system accordingly can determine if the self-guiding machine is getting close to any obstacle that it should be avoid. Therefore, the system can issue an alarm in advance for the self-guiding machine.

To sum up the above embodiments, the system for obstacle detection can be adapted to a self-guiding machine such as an autonomous vehicle or an autonomous cleaning robot. The system can acquire a spatial relationship between the self-guiding machine and the obstacle according to at least one feature extracted from an indicator light projected onto the path the self-guiding machine travels over. The spatial relationship allows the self-guiding machine to compute a distance between the self-guiding machine and the obstacle so as to determine if the self-guiding machine will collide with a wall, or determine if the self-guiding machine will fall from a cliff. The invention provides the self-guiding machine a solution to determine a distance from an obstacle and optionally to warn the self-guiding machine when it approaches the obstacle. Further, the system can accordingly instruct the driving system of the self-guiding machine to avoid the obstacle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for obstacle detection installed in a self-guiding machine, comprising:
 a controller;
 a linear light source coupled to the controller, wherein the linear light source emits a linear light as an indicator light, and the indicator light is a vertical linear light projected onto a path the self-guiding machine travels toward; and
 a light sensor coupled to the controller, wherein the light sensor is used to sense the indicator light projected onto the path, and the linear light source and the light sensor are set apart at a distance;
 wherein, when the self-guiding machine approaches a floating obstacle with a height from a ground and the indicator light is projected to the floating obstacle, the vertical linear light is segmented into a first segment projected to the ground and a second segment projected to the floating obstacle, in which the second segment of the indicator light sensed by the light sensor is used to determine that there is the floating obstacle in front of the self-guiding machine.

2. The system according to claim 1, wherein the system obtains a spatial relationship that is used to compute a distance between the self-guiding machine and the floating obstacle, and determine if the self-guiding machine will collide with the floating obstacle when compared with a collision threshold stored in a memory of the system.

3. The system according to claim 2, wherein, any change of a length, a slope, a position and/or an area of the indicator light in an image of the first segment and the indicator light in an image of the second segment within a time period is used to determine a change of the spatial relationship between the self-guiding machine and the floating obstacle.

4. The system according to claim 2, wherein the controller is instructed to drive the self-guiding machine to avoid the floating obstacle when the self-guiding machine reaches the collision threshold.

5. The system according to claim 1, wherein at least one feature of the indicator light being sensed is a length of the first segment or the second segment, a position of the second segment and/or a slope of the first segment.

6. The system according to claim 5, wherein, a change of a length of the indicator light is used to obtain a moving trend of the self-guiding machine and to determine whether or not the self-guiding machine approaches the floating obstacle.

7. The system according to claim 1, wherein the linear light source emits a type of the indicator light, and the light sensor captures one image at one time or a series of images containing the indicator light for a period of time.

8. The system according to claim 7, wherein information extracted from any of the images is used to estimate a distance to the floating obstacle.

9. The system according to claim 7, wherein, a change occurring in the series of images is used to determine whether or not the self-guiding machine approaches the floating obstacle.

10. The system according to claim 1, wherein the light sensor senses the indicator light to obtain at least one feature including a length, a position, a slope or an area of the indicator light.

11. The system according to claim 10, wherein, any change of the length, the slope, the position and/or the area of the indicator light in an image of the first segment and the indicator light in an image of the second segment within a time period is used to determine a change of a spatial relationship between the self-guiding machine and the floating obstacle.

* * * * *